US010329892B2

(12) United States Patent
Bermudez Martinez

(10) Patent No.: US 10,329,892 B2
(45) Date of Patent: *Jun. 25, 2019

(54) CROSS-PLOT ENGINEERING SYSTEM AND METHOD

(71) Applicant: Petrolink International Ltd., Douglas (IM)

(72) Inventor: Rafael Angel Bermudez Martinez, Houston, TX (US)

(73) Assignee: Petrolink International Ltd., Douglas (IM)

( * ) Notice: Subject to any disclaimer, the term of this patent is extended or adjusted under 35 U.S.C. 154(b) by 139 days.

This patent is subject to a terminal disclaimer.

(21) Appl. No.: 15/343,535

(22) Filed: Nov. 4, 2016

(65) Prior Publication Data

US 2017/0051601 A1    Feb. 23, 2017

Related U.S. Application Data

(63) Continuation of application No. 14/018,298, filed on Sep. 4, 2013, now Pat. No. 9,512,707, which is a
(Continued)

(51) Int. Cl.
*E21B 47/00* (2012.01)
*E21B 44/00* (2006.01)
(Continued)

(52) U.S. Cl.
CPC .............. *E21B 47/00* (2013.01); *E21B 44/00* (2013.01); *E21B 45/00* (2013.01); *E21B 47/024* (2013.01);
(Continued)

(58) Field of Classification Search
CPC .... E21B 47/00; E21B 47/024; E21B 47/0002; E21B 44/00; E21B 45/00; E21B 49/08;
(Continued)

(56) References Cited

U.S. PATENT DOCUMENTS 5,128,866 A   7/1992  Weakley
6,109,368 A   8/2000  Goldman et al.
(Continued)

OTHER PUBLICATIONS

McLaren et al., Improving the Value of Real-Time Drilling Data to Aid Collaboration, Drilling Optimization, and Decision Making, Nov. 11-14, 2007, 2007 SPE Annual Technical Conference and Exhibition, Anaheim, CA, 13 pp.*
(Continued)

*Primary Examiner* — Toan M Le
(74) *Attorney, Agent, or Firm* — Winstead PC

(57) ABSTRACT

In one embodiment, a method includes facilitating a real-time cross-plot display of drilling-performance data for a current well. The real-time cross-plot display includes a plurality of data plots represented on a common graph such that each data plot specifying at least two drilling parameters. Each data plot includes a plurality of data points such that each data point is expressable as Cartesian coordinates in terms of the at least two drilling parameters. The method further includes receiving new channel data for the current well from a wellsite computer system. In addition, the method includes creating, from the new channel data, new data points for the plurality of data plots as the new channel data is received. Moreover, the method includes updating the plurality of data plots with the new data points as the new data points are created.

20 Claims, 7 Drawing Sheets

Related U.S. Application Data continuation-in-part of application No. 13/919,240, filed on Jun. 17, 2013, now Pat. No. 9,518,459.

(60) Provisional application No. 61/660,565, filed on Jun. 15, 2012, provisional application No. 61/697,687, filed on Sep. 6, 2012.

(51) Int. Cl.
*E21B 45/00* (2006.01)
*E21B 47/024* (2006.01)
*E21B 49/00* (2006.01)
*E21B 49/08* (2006.01)
*G06T 11/20* (2006.01)

(52) U.S. Cl.
CPC .............. *E21B 49/00* (2013.01); *E21B 49/08* (2013.01); *G06T 11/206* (2013.01)

(58) Field of Classification Search
CPC ... E21B 49/00; G06T 11/206; G06Q 10/0639; G06Q 10/06395
See application file for complete search history.

(56) References Cited

U.S. PATENT DOCUMENTS

| | | | |
|---|---|---|---|
| 6,411,902 | B1 | 6/2002 | Wiltshire |
| 6,826,486 | B1 | 11/2004 | Malinverno |
| 7,054,750 | B2 | 5/2006 | Rodney et al. |
| 7,066,284 | B2 | 6/2006 | Wylie et al. |
| 7,142,986 | B2 | 11/2006 | Moran |
| 7,225,879 | B2 | 6/2007 | Wylie et al. |
| 7,341,117 | B2 | 3/2008 | Wylie et al. |
| 7,542,979 | B2 | 6/2009 | Gupta et al. |
| 7,571,777 | B2 | 8/2009 | Wylie et al. |
| 7,606,666 | B2 | 10/2009 | Repin et al. |
| 7,836,973 | B2 | 11/2010 | Belcher et al. |
| 7,980,312 | B1 | 7/2011 | Hill et al. |
| 8,011,446 | B2 | 9/2011 | Wylie et al. |
| 8,122,975 | B2 | 2/2012 | Belcher et al. |
| 8,615,374 | B1 | 12/2013 | Discenzo |
| 9,191,266 | B2 | 11/2015 | Abraham et al. |
| 9,512,707 | B1 * | 12/2016 | Bermudez Martinez ............... E21B 44/00 |
| 9,518,459 | B1 | 12/2016 | Bermudez Martinez et al. |
| 2003/0074139 | A1 | 4/2003 | Poedjono |
| 2004/0019696 | A1 | 1/2004 | Scott et al. |
| 2004/0149431 | A1 | 8/2004 | Wylie et al. |
| 2005/0063251 | A1 | 3/2005 | Guidry et al. |
| 2005/0197777 | A1 | 9/2005 | Rodney et al. |
| 2005/0209866 | A1 | 9/2005 | Veeningen et al. |
| 2005/0241855 | A1 | 11/2005 | Wylie et al. |
| 2005/0267899 | A1 | 12/2005 | Gupta et al. |
| 2006/0173625 | A1 | 8/2006 | Moran |
| 2007/0047279 | A1 | 3/2007 | Evans et al. |
| 2007/0061081 | A1 | 3/2007 | Moran |
| 2007/0185696 | A1 | 8/2007 | Moran et al. |
| 2007/0187146 | A1 | 8/2007 | Wylie et al. |
| 2007/0252717 | A1 | 11/2007 | Fielder |
| 2007/0284147 | A1 | 12/2007 | Moran |
| 2008/0060846 | A1 | 3/2008 | Belcher et al. |
| 2008/0087423 | A1 | 4/2008 | Wylie et al. |
| 2008/0179094 | A1 | 7/2008 | Repin et al. |
| 2008/0181230 | A1 | 7/2008 | Hitt et al. |
| 2008/0184269 | A1 | 7/2008 | Avery et al. |
| 2008/0208475 | A1 | 8/2008 | Karr et al. |
| 2008/0262810 | A1 | 10/2008 | Moran et al. |
| 2008/0294606 | A1 | 11/2008 | Moran et al. |
| 2009/0090555 | A1 | 4/2009 | Boone et al. |
| 2009/0132458 | A1 | 5/2009 | Edwards et al. |
| 2009/0159336 | A1 | 6/2009 | Boone |
| 2009/0182472 | A1 | 7/2009 | Singh et al. |
| 2009/0234584 | A1 | 9/2009 | Casey et al. |
| 2009/0254569 | A1 | 10/2009 | Paulk et al. |
| 2009/0308616 | A1 | 12/2009 | Wylie et al. |
| 2010/0005111 | A1 | 1/2010 | Bal et al. |
| 2010/0179963 | A1 | 7/2010 | Conner et al. |
| 2010/0191511 | A1 | 7/2010 | Hsu et al. |
| 2010/0204972 | A1 | 8/2010 | Hsu et al. |
| 2010/0217530 | A1 | 8/2010 | Boone |
| 2010/0259415 | A1 | 10/2010 | Strachan et al. |
| 2011/0106856 | A2 | 5/2011 | Mr. Paulk et al. |
| 2011/0114387 | A1 | 5/2011 | Belcher et al. |
| 2011/0132662 | A1 | 6/2011 | Dennis |
| 2011/0166843 | A1 | 7/2011 | Hsu et al. |
| 2011/0170373 | A1 | 7/2011 | Hsu et al. |
| 2011/0174541 | A1 | 7/2011 | Strachan et al. |
| 2011/0175899 | A1 | 7/2011 | Bittar et al. |
| 2013/0013677 | A1 | 1/2013 | Engstrom et al. |
| 2013/0135115 | A1 | 5/2013 | Johnson et al. |
| 2015/0347565 | A1 | 12/2015 | Abraham et al. |
| 2016/0281498 | A1 | 9/2016 | Nguyen et al. |
| 2017/0052282 | A1 | 2/2017 | Bermudez Martinez et al. |

OTHER PUBLICATIONS

U.S. Appl. No. 15/446,761, Gonzalez.
U.S. Appl. No. 13/829,590, filed Sep. 26, 2013, Abraham et al.
U.S. Appl. No. 13/919,240, filed Dec. 13, 2016, Bermudez Martinez et al.
U.S. Appl. No. 14/018,298, filed Dec. 6, 2016, Bermudez Martinez.
U.S. Appl. No. 14/820,955, filed Mar. 12, 2015, Abraham et al.
U.S. Appl. No. 14/477,444, Bermudez Martinez.
U.S. Appl. No. 15/343,836, filed Feb. 23, 2017, Bermudez Martinez et al.
Halliburton / Landmark Software & Services, "Drillworks® User Guide", Oct. 2009.
Martínez, R.B., Petrolink Services, Inc., and Olán, C.I., Petrolink Services, Inc., "Improving Real-Time Drilling Optimization Applying Engineering Performance From Offset Wells." SPWLA 53rd Annual Logging Symposium, Jun. 16-20, 2012.
Khudiri, M.M. and Shehry, M.A., Saudi Aramco, and Curtis, J.D., Petrolink International, "Data Architecture of Real-Time Drilling and Completions Information at Saudi Aramco;" SPE 116848, 2008 SPE Russian Oil & Gas Technical Conference and Exhibition, Moscow, Russia, Oct. 28-30, 2008.
Pérez-Téllez, C., Rodríguez, R., and Ramírez, I., PEMEX Drilling Business Unit, and Bermúdez-Martínez, R.A., and Palavicini-Cham, C.A., Petrolink Services Inc., "Applying a Real-Time Engineering Methodology to Drill Ahead of Potential Undesirable Events;" OTC 23180, Offshore Technology Conference, Houston, Texas, USA, Apr. 30-May 3, 2012.

* cited by examiner

CROSS-PLOT ENGINEERING SYSTEM AND METHOD

CROSS-REFERENCE TO RELATED APPLICATIONS

This patent application is a continuation of U.S. patent application Ser. No. 14/018,298, filed on Sep. 4, 2013, now U.S. Pat. No. 9,512,707. U.S. patent application Ser. No. 14/018,298 is a continuation-in-part of U.S. patent application Ser. No. 13/919,240, filed on Jun. 17, 2013, now U.S. Pat. No. 9,518,459. U.S. patent application Ser. No. 13/919,240 claims priority from U.S. Provisional Application No. 61/660,565, filed on Jun. 15, 2012. U.S. patent application Ser. No. 14/018,298 claims priority from U.S. Provisional Application No. 61/697,687, filed on Sep. 6, 2012. U.S. patent application Ser. No. 14/018,298, U.S. patent application Ser. No. 13/919,240, U.S. Provisional Application No. 61/660,565, and U.S. Provisional Application No. 61/697,687 are hereby incorporated by reference in their entirety.

BACKGROUND

Technical Field

The present invention relates generally to drilling analytics and more particularly, but not by way of limitation, to systems and methods for enabling real-time drilling-performance analysis.

History of Related Art

Over the years, the world of drilling has become increasingly technical. Drilling professionals constantly search for engineering solutions to achieve profitable production targets efficiently. Thus, the oil-and-gas industry continues to develop new drilling-engineering techniques to facilitate the understanding of geological and physical phenomena that occur during drilling operations worldwide. However, it is difficult to present information in a timely and comprehensive manner, for example, to a drilling engineer, so that appropriate decisions can be made.

SUMMARY OF THE INVENTION

In one embodiment, a method includes, on a central computing system comprising at least one server computer, facilitating a real-time cross-plot display of drilling-performance data for a current well. The real-time cross-plot display includes a plurality of data plots represented on a common graph such that each data plot specifies at least two drilling parameters. Each data plot comprises a plurality of data points such that each data point is expressable as Cartesian coordinates in terms of the at least two drilling parameters. The method also includes the central computing system receiving new channel data for the current well from a wellsite computer system. In addition, the method includes the central computing system creating, from the new channel data, new data points for the plurality of data plots as the new channel data is received. Furthermore, the method includes the central computing system updating the plurality of data plots with the new data points as the new data points are created.

In one embodiment, a system includes at least one server computer. The at least one server computer is operable to perform a method. The method includes facilitating a real-time cross-plot display of drilling-performance data for a current well. The real-time cross-plot display comprises a plurality of data plots represented on a common graph such that each data plot specifying at least two drilling parameters. Each data plot includes a plurality of data points such that each data point is expressable as Cartesian coordinates in terms of the at least two drilling parameters. The method further includes receiving new channel data for the current well from a wellsite computer system. In addition, the method includes creating, from the new channel data, new data points for the plurality of data plots as the new channel data is received. Moreover, the method includes updating the plurality of data plots with the new data points as the new data points are created.

In one embodiment, a computer-program product includes a computer-usable medium having computer-readable program code embodied therein. The computer-readable program code is adapted to be executed to implement a method. The method includes facilitating a real-time cross-plot display of drilling-performance data for a current well. The real-time cross-plot display comprises a plurality of data plots represented on a common graph such that each data plot specifying at least two drilling parameters. Each data plot includes a plurality of data points such that each data point is expressable as Cartesian coordinates in terms of the at least two drilling parameters. The method further includes receiving new channel data for the current well from a wellsite computer system. In addition, the method includes creating, from the new channel data, new data points for the plurality of data plots as the new channel data is received. Moreover, the method includes updating the plurality of data plots with the new data points as the new data points are created.

BRIEF DESCRIPTION OF THE DRAWINGS

A more complete understanding of the method and apparatus of the present invention may be obtained by reference to the following Detailed Description when taken in conjunction with the accompanying Drawings wherein.

DETAILED DESCRIPTION OF ILLUSTRATIVE EMBODIMENTS OF THE INVENTION

In various embodiments, a real-time cross-plot display can integrate a plurality of data plots that depict selected drilling parameters and/or drilling events for a given well. In certain embodiments, the real-time cross-plot display can be created when drilling operations commence for a given well and be continuously updated from that point forward.

For purposes of this patent application, drilling parameters can include any type or segmentation of channel data, input data, calculated data, and combinations thereof. For example, the drilling parameters can relate to depth, date, densities, geological formation, volume loss and gain, casing points, offset well casing points, trajectory analysis (e.g., inclination, azimuth, etc.), fluid properties (plastic viscosity, yield point, etc.), standard pipe pressure (SPP), rate of penetration (ROP), equivalent circulating density (ECD), gallons per minute (GPM), weight on bit (WOB), torque, hook load, and/or the like. In addition, trapping, drag, friction, resistance, and technical comments can be integrated while drilling advances meter by meter, thereby allowing simultaneous identification of a drilling technical condition that is different from what is expected (e.g., a drilling event). In a typical embodiment, drilling-performance cross plots can be shown in real-time on a real-time display (i.e., a real-time cross-plot display).

In various embodiments, cross-plots can be defined and used as needed for a given well. In these embodiments, each cross plot can include a selection of drilling parameters and drilling events, a defined presentation format, and a defined period of time (e.g., from a time when drilling begins). The presentation format can specify, for example, how and where the drilling parameters and drilling events are graphically presented. In addition, in various embodiments, a drilling professional such as, for example, a drilling engineer, can create a custom cross-plot by selecting drilling parameters and drilling events and specifying a presentation format.

In addition, in various embodiments, real-time drilling-performance analytics such as, for example, pore pressure and fracture gradient, can be facilitated by leveraging historical drilling-performance data from offset wells. As one of ordinary skill in the art will appreciate, an offset well is a pre-existing well that is in close proximity to the current well. For example, an offset well can be located adjacently to the current well according to spacing rules defined by applicable law. However, it should be appreciated that immediate adjacency need not be required.

Figure 1:
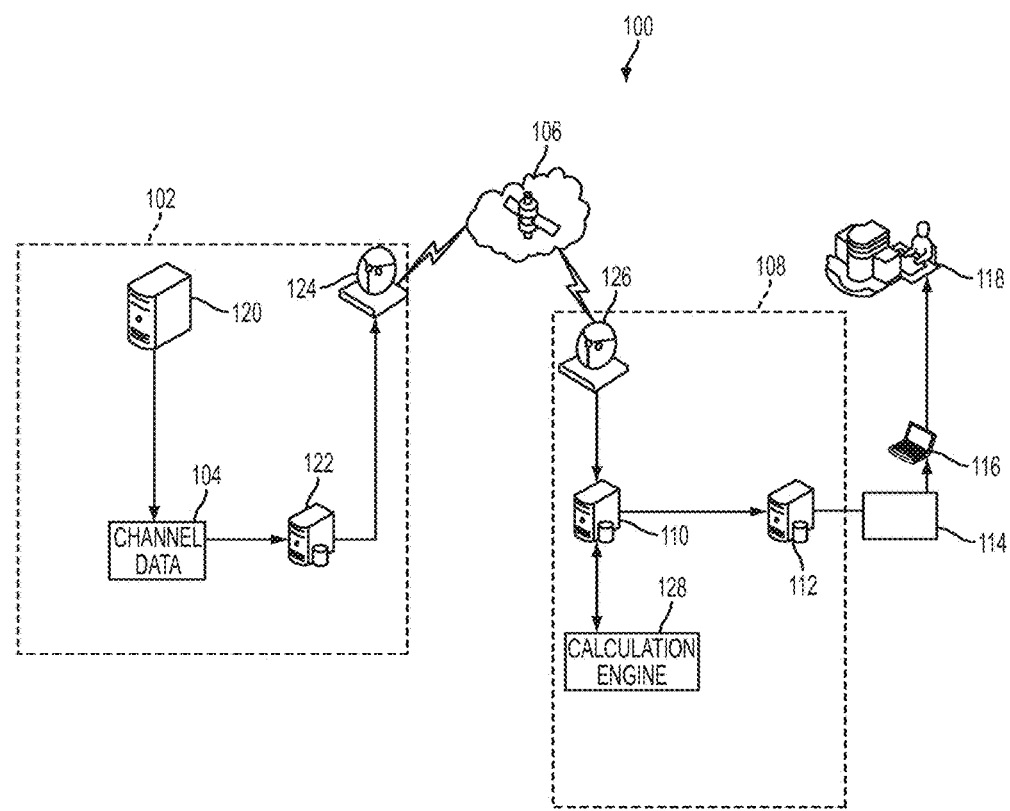
FIG. 1 illustrates a system for facilitating real-time drilling-performance analysis.

FIG. 1 illustrates a system 100 for facilitating real-time drilling-performance analysis. The system 100 includes a wellsite computer system 102, a central computing system 108, and a communications network 106. The wellsite computer system 102 includes a collection server 120, a remote-integration server 122, and a network link 124. The central computing system 108 includes a main server 110, a repository server 112, and a network link 126. It should be appreciated that the depicted configurations of the central computing system 108 and the wellsite computer system 102 are illustrative in nature. The central computing system 108 and the wellsite computer system can each include any number of physical or virtual server computers and databases. For example, in various embodiments, the remote-integration server 122 may be omitted or have its functionality integrated into the collection server 120. Other modifications and rearrangements will be apparent to one of ordinary skill in the art after reviewing inventive principles contained herein.

In a typical embodiment, the wellsite computer system 102 is located at or near a wellsite for a current well and communicates with the central computing system 108 over the communications network 106. The communications network 106 may include, for example, satellite communication between the network link 124 of the wellsite computer system 102 and the network link 126 of the central computing system 108. Thus, the network link 124 and the network link 126 can be, for example, satellite links. For simplicity of description, communication between the wellsite computer system 102 and the central computing system 108 may be described below without specific reference to the network link 124, the network link 126, and the communications network 106.

Using, for example, logging while drilling (LWD), the collection server 120 receives and/or generates channel data 104 (e.g., in WITS0) via data received from sensors that are in use at the wellsite. A given sensor or other source of data is referred to herein as a "channel." Data from a channel may be referred to as "channel data," which term is inclusive of both raw data and metadata. The raw data includes, for example, measured data determined by the sensor or source. The measured data can include, for example, resistivity, porosity, permeability, density, and gamma-ray data. The metadata includes information about the raw data such as, for example, time, depth, identification information for the channel, and the like. The collection server 120 transmits the channel data 104 to the remote-integration server 122, which communicates the channel data 104 to the central computing system 108 in real-time.

On the central computing system 108, the main server 110 receives the channel data 104 from the wellsite computer system 102 and converts the channel data 104 to a common data format. The conversion of channel data to a common data format is described in detail in U.S. patent application Ser. No. 13/829,590, which application is hereby incorporated by reference. As shown, the main server 110 has a calculation engine 128 resident thereon. Via the calculation engine 128, the main server 110 generates calculated data in real-time based on the channel data 104. The calculation engine 128 can be, for example, a software application that implements algorithms to generate the calculated data. Based on gamma-ray and resistivity data and other input data described with respect to FIG. 3, the calculated data can include, for example, pore pressure and a fracture gradient.

The calculation engine 128 can also maintain settings that are utilized for generating the calculated data. For example, implementation of Eaton and/or Mathews-and-Kelly algorithms may require certain parameters such as an Eaton exponent, a matrix stress coefficient, and a Poisson ratio. In a typical embodiment, the settings maintained on the main server 110 specify values for such parameters. If the value to be used for a given parameter is not constant across all wells (e.g. varying based on geography or well-specific data), the settings further specify rules for selecting or calculating the value, as applicable. The settings permit the calculation engine 128 to acquire necessary parameters without the need for individual configuration for each well.

The repository server 112 stores and maintains the channel data 104 and any calculated data according to the common data format. Storage and maintenance of data according to the common data format is described in detail in U.S. patent application Ser. No. 13/829,590, which application is incorporated by reference above. In a typical embodiment, the repository server 112 stores channel data from a plurality of wellsite computer systems located at a plurality of wellsites in this fashion. In addition, the repository server 112 typically maintains historical drilling-performance data (e.g., channel data, calculated data, etc.) for offset wells relative to the current well.

The repository server 112 facilitates a real-time display 114 of drilling-performance data related to the wellsite. In a typical embodiment, the real-time display 114 is provided via a network such as, for example, the Internet, via a web interface. The real-time display 114 is typically shown and updated in real time on a computing device 116 as the channel data 104 is received. For example, in certain embodiments, the real-time display 114 can include gamma-ray and resistivity data for a formation being drilled. An example of these embodiments will be described with respect to FIGS. 2 and 3. As described with respect to FIGS. 2 and 3, the real-time display 114 can allow engineering personnel 118 to perform real-time drilling analysis for the wellsite.

By way of further example, in various embodiments, the real-time display 114 can be a real-time cross-plot display. In these embodiments, the real-time display 114 is operable to show, on a common graph, a cross-plot that integrates a plurality of data plots. The cross-plot generally includes at least one horizontal axis and at least one vertical axis. Each data plot of the cross-plot generally specifies at least two drilling parameters such that one drilling parameter is associated with a horizontal axis of the cross-plot and one drilling parameter is associated with a vertical axis of the cross-plot. In that way, each data plot represents a set of data points that can be expressed, for example, as Cartesian coordinates in terms of the at least two drilling parameters.

For example, if a given data plot specifies fluid gain/loss and time as the at least two drilling parameters, data points of the given data plot could be expressed as Cartesian coordinates in terms of a fluid gain/loss value and a time (e.g., day, time, hour) at which the fluid gain/loss value was collected. It should be appreciated that the cross-plot can include more than one horizontal axis and/or more than one vertical axis. In various embodiments, the inclusion of multiple horizontal axes and/or multiple vertical axes further facilitates the presentation of disparate drilling-performance data. Examples of a real-time cross-plot display will be described with respect to FIGS. 4-7.

For purposes of illustration, examples of equations that can be used to compute calculated data will now be described. In some embodiments, pore pressure (Pp) can be computed using the Eaton method as embodied in Equation 1 below, where S represents stress (i.e. pressure exerted by the weight of the rocks and contained fluids thereabove in units of, e.g., g/cc), PPN represents normal pore pressure according to a hydrostatic gradient, Ro represents observed resistivity, Rn represents normal resistivity, and x represents an Eaton exponent.

$$Pp = S - (S - PPN)\left(\frac{Ro}{Rn}\right)^x \quad \text{Equation 1}$$

For purposes of this example, S, PPN, Ro, and Rn are input data for calculating pore pressure. In particular, S and Ro are examples of parameters that can be provided by channel data for the current well. The Eaton exponent (x) is an example of a parameter that can be retrieved from settings maintained by the calculation engine 128 of FIG. 1. In some embodiments, PPN can also be retrieved from settings maintained by the calculation engine 128. In a typical embodiment, Rn is obtained using historical drilling-performance data for an offset well. In this fashion, pore pressure for the current well can be calculated in real-time by retrieving resistivity data for the offset well. A specific example will be described with respect to FIG. 3.

In various embodiments, a fracture gradient (Fg) can be computed using the Eaton method as embodied in Equation 2 below, where Pp and S represent pore pressure and stress, respectively, as described above and v represents a Poisson ratio.

$$Fg = Pp + (S - Pp)\left(\frac{v}{1-v}\right) \quad \text{Equation 2}$$

For purposes of the example of Equation 2, stress (S), pore pressure (Pp) and the Poisson ratio (v) are input data for calculating a fracture gradient for a current well. Pp can be computed as described with respect to Equation 1 above. Stress (S) can also be obtained as described with respect to Equation 1. The Poisson ratio (v) is an example of an input value that can be retrieved from settings maintained by the calculation engine 128 as described with respect to FIG. 1.

In various embodiments, a fracture gradient (Fg) can also be computed using the Matthews and Kelly method as embodied in Equation 3 below, where Pp and S represent pore pressure and stress, respectively, as described above and $\kappa_i$ represents a matrix stress coefficient.

$$Fg = Pp + (S - Pp)\kappa_i \quad \text{Equation 3}$$

For purposes of the example of Equation 3, stress (S), pore pressure (P) and the matrix stress coefficient ($\kappa_i$) are input data for calculating a fracture gradient for a current well. The pore pressure (Pp) and stress (S) can be obtained as described with respect to Equation 2. $\kappa_i$ is an example of an input value that can be retrieved from settings maintained by the calculation engine 128 as described with respect to FIG. 1.

Figure 2:
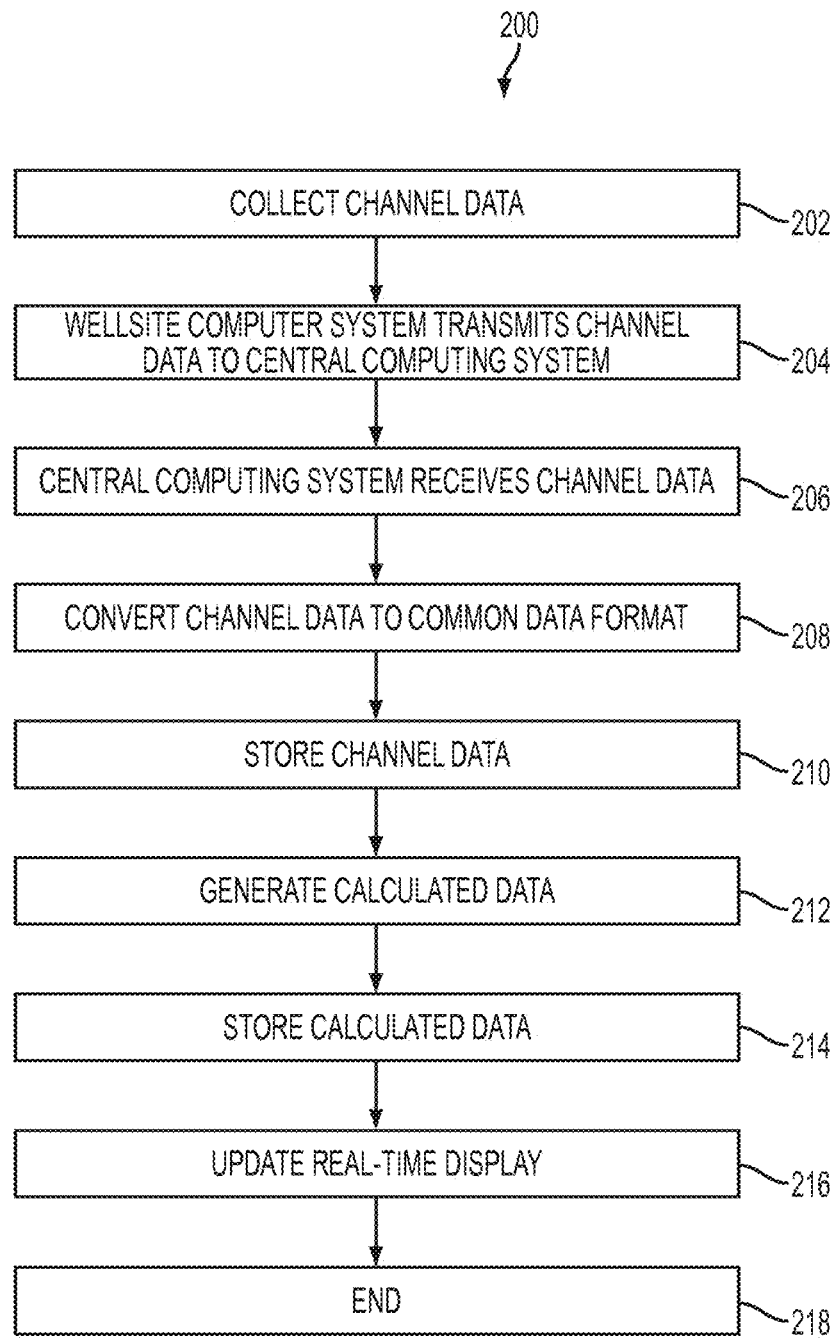
FIG. 2 illustrates a process for performing real-time drilling analysis.

FIG. 2 illustrates a process 200 for performing real-time drilling analysis using the system 100 of FIG. 1. At step 202, the wellsite computer system 102 collects the channel data 104 in real-time from sensors via, for example, LWD. The channel data 104 is received in an initial data format such as, for example, WITS0. From step 202, the process 200 proceeds to step 204. At step 204, the wellsite computer system 102 transmits the channel data 104 to the central computing system 108 via the communications network 106. From step 204, the process 200 proceeds to step 206. At step 206, the central computing system 108 receives the channel data from the wellsite computer system 102. From step 206, the process 200 proceeds to step 208.

At step 208, the central computing system 108 converts the channel data 104 to a common data format. From step 208, the process 200 proceeds to step 210. At step 210, the channel data 104 is stored on the central computing system 108 according to the common data format. From step 210, the process 200 proceeds to step 212. At step 212, the calculation engine 128 generates calculated data based on the channel data 104, settings, and other input data described with respect to FIG. 3. As described above, the calculation engine 128 may be, for example, a software application that implements algorithms to generate the calculated data. From step 212, the process 200 proceeds to step 214.

At step 214, the central computing system 108 stores the calculated data. For example, the calculated data can be stored on the repository server 112. From step 214, the process 200 proceeds to step 216. At step 216, the central computing system 108 updates the real-time display 114 to include selected data such as, for example, all or part of the channel data 104 and all or part of the calculated data. Examples of the real-time display 114 will be described in greater detail with respect to FIGS. 3-7. From step 216, the process 200 proceeds to step 218. At step 218, the process 200 ends.

Figure 3:
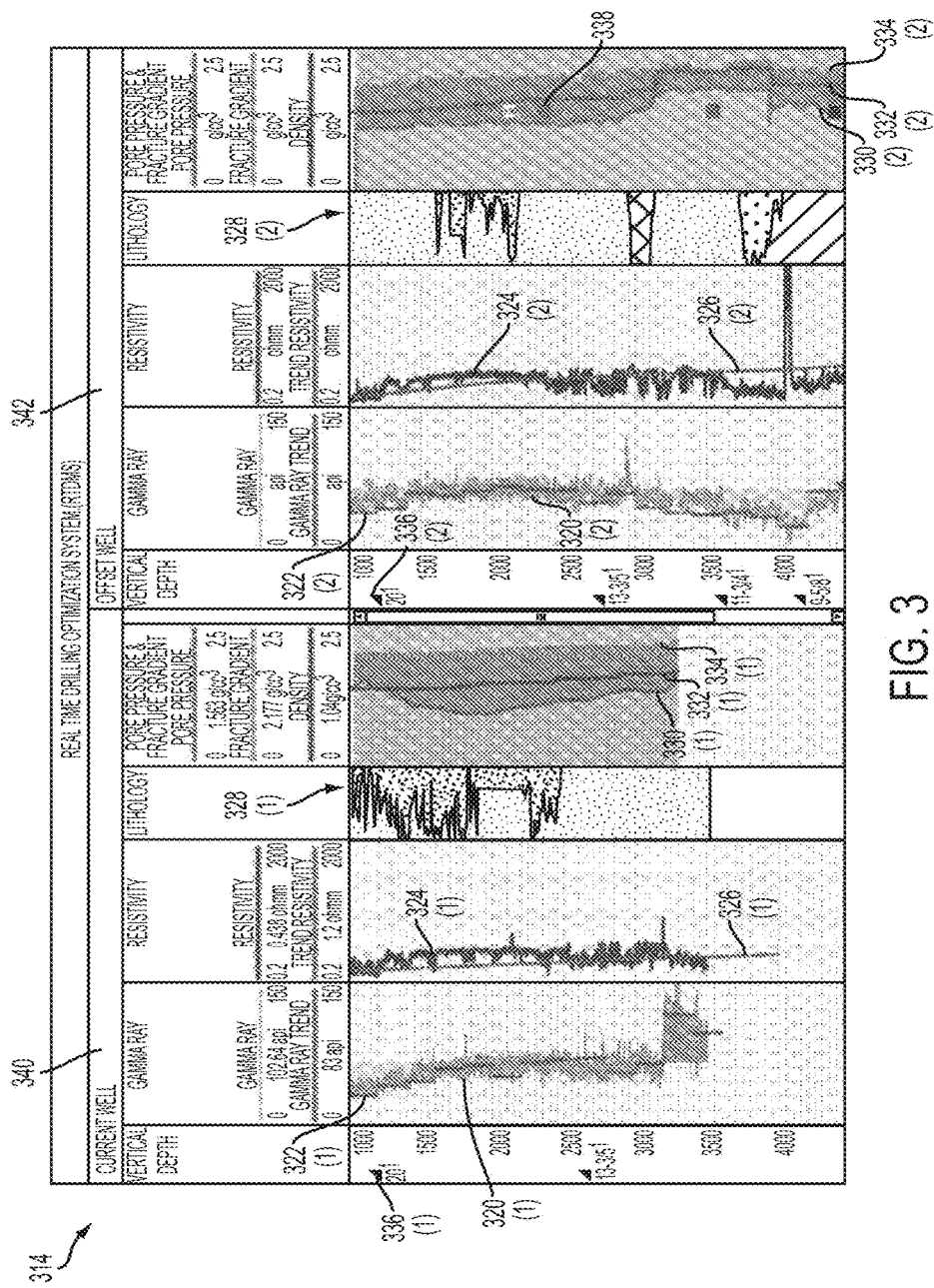
FIG. 3 illustrates an example of real-time drilling-performance analysis via a real-time display.

FIG. 3 illustrates an example of real-time drilling-performance analysis via a real-time display 314. To facilitate comparative analysis, for example, by a drilling engineer, the real-time display 314 depicts drilling-performance data for both a current well 340 and an offset well 342 relative to true vertical depth (TVD). In a typical embodiment, the offset well 342 is pre-selected and associated with the current well 340 due to its geographic proximity to the current well 340. In various embodiments, the pre-selection can be made by drilling personnel such as a drilling engineer and stored by a repository server such as the repository server 112 of FIG. 1.

The drilling-performance data depicted by the real-time display 314 can include, inter alia, selected channel data, input data, calculated data, casing-point data, and event data. The selected channel data includes, for example, channel data from a well site that is received at a central computing system, converted to a common data format, and stored as described with respect to FIGS. 1 and 2. The input data is additional data that is received, for example, from a drilling engineer or from other data stored within a repository such as a repository maintained by the repository server 112 of FIG. 1. The calculated data is data that is calculated, for example, by a calculation engine such as the calculation engine 128 of FIG. 1. The casing-point data includes information related to the placement and size of casing utilized in a given well. The event data is data related to certain detected events at a well such as, for example, a stuck pipe, lost circulation, or a kick (i.e., undesired influx of formation fluid into the wellbore).

With respect to the current well 340, the real-time display 314 shows selected channel data, input data, calculated data, and casing-point data. In particular, the selected channel data for the current well 340 includes gamma-ray data 320(1), resistivity data 324(1), lithography 328(1), and fluid density 332(1). The input data for the current well 340 includes gamma-ray trend lines 322(1) (also referred to herein as shale lines) and a resistivity-trend line 326(1) (also referred to herein as a normal compaction trend). The calculated data for the current well 340 includes pore pressure 330(1) and fracture gradient 334(1). The casing-point data includes one or more casing points 336(1) (which are updated in real time).

With respect to the offset well 342, the real-time display 314 shows selected channel data, input data, calculated data, casing-point data, and event data. It should be appreciated that all such data for the offset well 342 is generally historical drilling-performance data (as opposed to real-time data for the current well 340). In particular, the selected channel data for the offset well 342 includes gamma-ray data 320(2), resistivity data 324(2), lithography 328(2), and fluid density 332(2). The input data for the offset well 342 includes gamma-ray trend lines 322(2) (also referred to herein as shale lines) and a resistivity-trend line 326(2) (also referred to herein as a normal compaction trend). The calculated data for the current well 340 includes pore pressure 330(2) and fracture gradient 334(2). The casing-point data includes one or more casing points 336(2). The event data for the offset well 342 includes one or more drilling events 338.

With respect to the current well 340, acquisition of the input data will now be described. As mentioned above, the selected channel data for the current well 340 is displayed and refreshed in real-time as such data is received by a central computing system such as, for example, the central computing system 108 of FIG. 1. As the selected channel data is received, the central computing system 108 gathers the input data, i.e., the gamma-ray trend lines 322(1) and the resistivity-trend line 326(1). In a typical embodiment, the gamma-ray trend lines 322(1) are traced by drilling personnel such as, for example, a drilling, geological or geophysical engineer, who determines points of shale. Shale, as one of ordinary skill in the art will appreciate, generally emit more gamma rays than other sedimentary rocks. The gamma-ray trend lines 322(1) generally connect points of shale and represent an average of the gamma-ray data 320(1) between those shale points (i.e. spanning that trend line). For example, in various embodiments, a drilling engineer may be prompted at configurable points in time to trace the gamma-ray trend lines.

The resistivity-trend line 326(1) is typically acquired automatically from historical drilling-performance data for the offset well 342. In that way, the resistivity-trend line 326(2) (i.e., the normal compaction trend for the offset well 342) serves as the resistivity-trend line 326(1). The resistivity-trend line 326(2) is a normalization of the resistivity data 324 for the offset well 342.

The calculated data for the current well 340 is generated by a central computing system such as, for example, the central computing system 108 of FIG. 1, based on the selected channel data and the input data for the current well 340. In a typical embodiment, the calculated data for the current well 340 has defined relationships, established on the central computing system 108 of FIG. 1, with the selected channel data and the input data. Particularly, the gamma-ray data 320(1), the gamma-ray trend lines 322(1), the resistivity data 324(1), and the resistivity-trend line 326(1) are leveraged by a calculation engine such as, for example, the calculation engine 128, to compute the pore pressure 330(1) and the fracture gradient 334(1) in real time. In that way, published algorithms such as those developed by Eaton and Matthews and Kelly may be used in real time to compute the pore pressure 330(1) and the fracture gradient 334(1).

Moreover, the real-time display 314 also enables other types of real-time drilling-performance analyses. As one example of real-time drilling-performance analysis, the real-time display 314 enables drilling personnel such as, for example, drilling engineers, to perform real-time geopressure analysis. Drilling engineers are able to compare the pore pressure 330(1) and the fracture gradient 334(1) for the current well 340 with the pore pressure 330(2) and the fracture gradient 334(2) for the offset well. This real-time geopressure analysis allows drilling engineers to compare trends and anticipate changes based on the offset well 342. The geopressure analysis can also be correlated with the one or more drilling events 338, as described further below.

Further real-time drilling-performance analysis is enabled by the one or more drilling events 338. Each of the one or more drilling events 338 is typically plotted at a depth at which a defined adverse drilling event occurred in the offset well 342. The one or more drilling events 338 can include, for example, stuck pipes, lost circulation, kicks, and the like. As a result of the geographic proximity between the current well 340 and the offset well 342, circumstances that led to the one or more drilling events 338 are often likely to reoccur at similar depths in the current well 340. Therefore, the real-time display 314 allows drilling personnel to anticipate and plan for the one or more drilling events 338. In a typical embodiment, when the depth of the current well 340 is within a preconfigured distance of the depth at which one of the one or more drilling events 338 occurred (e.g., 500 feet), an alert is generated and presented to responsible personnel. The alert can be, for example, a beep or alarm. Responsive to the alert, the responsible personnel may perform, for example, the real-time geopressure analysis described above so that it can be determined if the pore pressure 330(1) is trending similarly to the pore pressure 330(2). Corrective action such as an adjustment in the fluid density 332(1) may be taken.

As another example of real-time drilling-performance analysis, the real-time display 314 further enables casing-point prediction. As described above, the real-time display 314 shows the one or more casing points 336(1) for the current well 340 and the one or more casing points 336(2) for the offset well 342. Using data from the one or more casing points 336(2), drilling personnel are able to predict both size and placement for future casing points for the current well 340.

A further example of real-time drilling-performance analysis enabled by the real-time display 314 relates to density analysis. As described above, the real-time display 314 displays both the fluid density 332(1) for the current well 340 and the fluid density 332(2) for the offset well 342. By reviewing and comparing density trends, drilling personnel such as, for example, drilling engineers, are able to determine if the fluid density 332(1) for the current well 340 should be increased, decreased, or maintained.

In a typical embodiment, the real-time display 314 can be customized based on the desires of drilling engineers. For example, the selected channel data can include more, less, or different channel data than described above. Likewise, the calculated data can have defined relationships with other channel data and/or input data for purposes of performing different calculations in real time.

Figure 4:
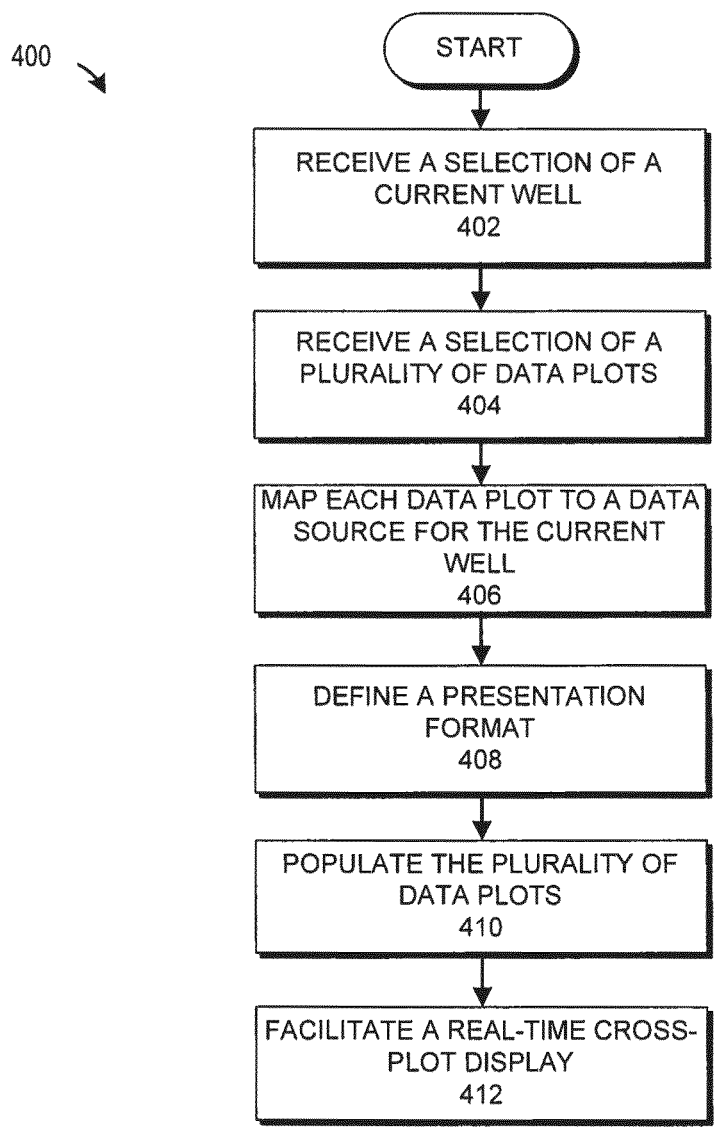
FIG. 4 illustrates a process for creating a cross plot.

FIG. 4 illustrates a process 400 for creating a cross plot using the system 100 of FIG. 1. At step 402, the central computing system 108 receives a selection of one or more wells from a user such as, for example, a drilling engineer. In a typical embodiment, the selection is of a current well (e.g., a well that is being drilled). From step 402, the process 400 proceeds to step 404.

At step 404, the central computing system 108 receives a selection of a plurality of data plots for the current well from the user. Each data plot generally specifies at least two drilling parameters such that one drilling parameter can be associated with a horizontal axis and one drilling parameter can be associated with a vertical axis. The at least two drilling parameters can correspond, for example, to depth, date, densities, geological formation, volume loss and gain, casing points, calculated data (e.g. pore pressure), input data, etc.

In some cases, a given data plot of the plurality of data plots can be a drilling-event data plot. The drilling-event data plot can correspond to one or more types of drilling events such as, for example, the one or more drilling events 338 of FIG. 3. The one or more drilling events can include, for example, stuck pipes, lost circulation, kicks, and the like. The at least two drilling parameters of the drilling-event data plot can include any of the drilling parameters described above. However, the drilling-event data plot will generally only include data points when, for example, a specified Boolean condition defining the event is met (e.g., stuck pipe, lost circulation, kicks, etc.). The one or more drilling events can be actual events that have been detected via new channel data for the current well. The one or more drilling events can also be historical drilling events for an offset well that are plotted, for example, at a depth at which such event occurred in the offset well. In that way, the one or more drilling events can facilitate alerting as described with respect to FIG. 3. From step 404, the process 400 proceeds to step 406.

At step 406, the central computing system 108 maps each data plot to data sources for the current well. As described above, each of the plurality of data plots generally specifies at least two drilling parameters. The mapping can include specifying which data fields form the basis for each drilling parameter. The drilling parameters may directly correspond to particular fields of channel data, calculated data, and/or the like. In that way, when, for example, new channel data for a current well is received, the central computing system 108 can at that time create new data points for the plurality of data plots. In some embodiments, the step 406 may be omitted when, for example, all drilling parameters are pre-mapped to channel data prior to the user's selection of the plurality of data plots. From step 406, the process 400 proceeds to step 408.

At step 408, the central computing system 108 defines a presentation format for the cross plot. In a typical embodiment, the presentation format encompasses specification of, for example, measurement units, data precision/scaling of the cross-plot, presentation attributes (e.g., color, layout, etc.), and/or the like. In various embodiments, the presentation format can be defined responsive to manual configuration by the user, technical personnel acting at the instruction of the user, and/or the like. The presentation format can also be defined based on pre-existing templates. It should be appreciated that different ones of the plurality of data plots may share a drilling parameter (e.g., time). In such cases, certain ones of the plurality of data plots may share an axis of the cross-plot. From step 408, the process 400 proceeds to step 410.

At step 410, the central computing system 108 populates the plurality of data plots with data points for the current well. From step 410, the process 400 proceeds to step 412. At step 412, the central computing system facilitates a real-time cross-plot display of the cross-plot in a fashion similar to that described above with respect to FIG. 2. The real-time cross-plot display can be viewed, for example, by a drilling engineer. In various embodiments, the real-time cross-plot display can be updated with technical comments of a user such as, for example, the drilling engineer. The technical comments can include drilling analysis of the user, be inserted at an appropriate place on the cross-plot, and be persistently stored as part of the cross-plot. The technical comments can then be viewed by whomever accesses the real-time cross-plot display. After step 412, the process 400 ends.

Figure 5:
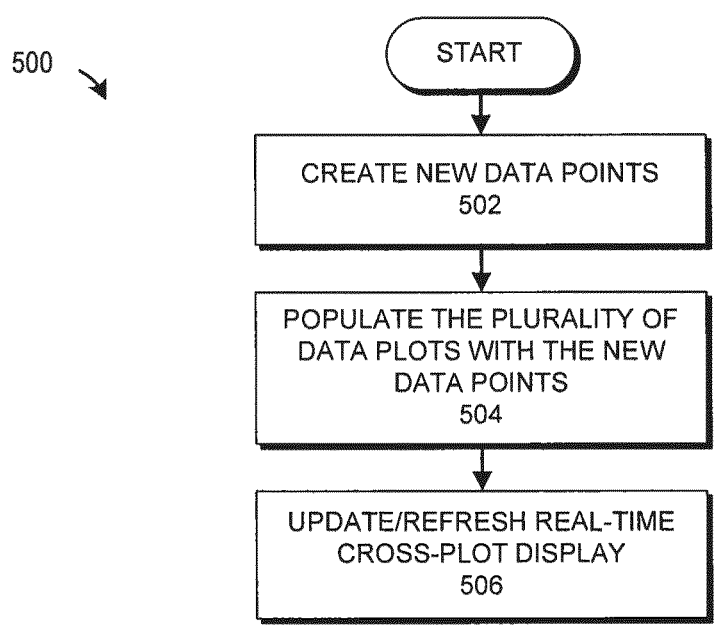
FIG. 5 illustrates a process for updating a real-time cross-plot display.

FIG. 5 illustrates a process 500 for updating a real-time cross-plot display using the system 100 of FIG. 1. The real-time cross-plot display includes a plurality of data plots and can be created, for example, as described with respect to FIG. 4. The process 500 begins at step 502. At step 502, the central computing system 108 creates new data points for the plurality of data plots. The new data points can be based on channel data, calculated data, and/or input data as described above. From step 502, the process 500 proceeds to step 504. At step 504, the central computing system 108 populates the plurality of data plots with the new data points. From step 504, the process 500 proceeds to step 506. At step 506, the central computing system 108 updates/refreshes the real-time cross-plot display. After step 506, the process 500 ends.

Figure 6:
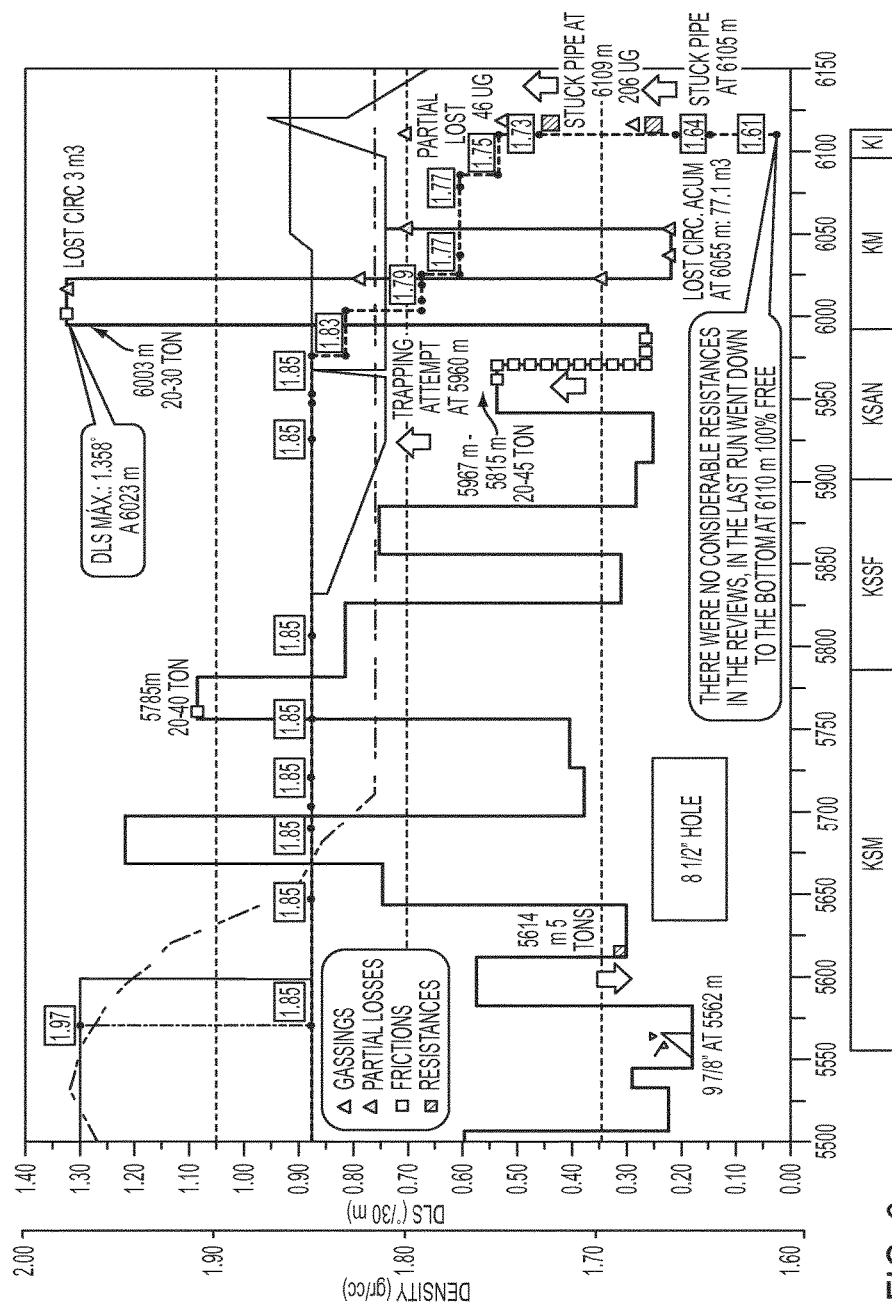
FIGS. 6-7 illustrate examples of real-time cross-plot displays.
Figure 7:
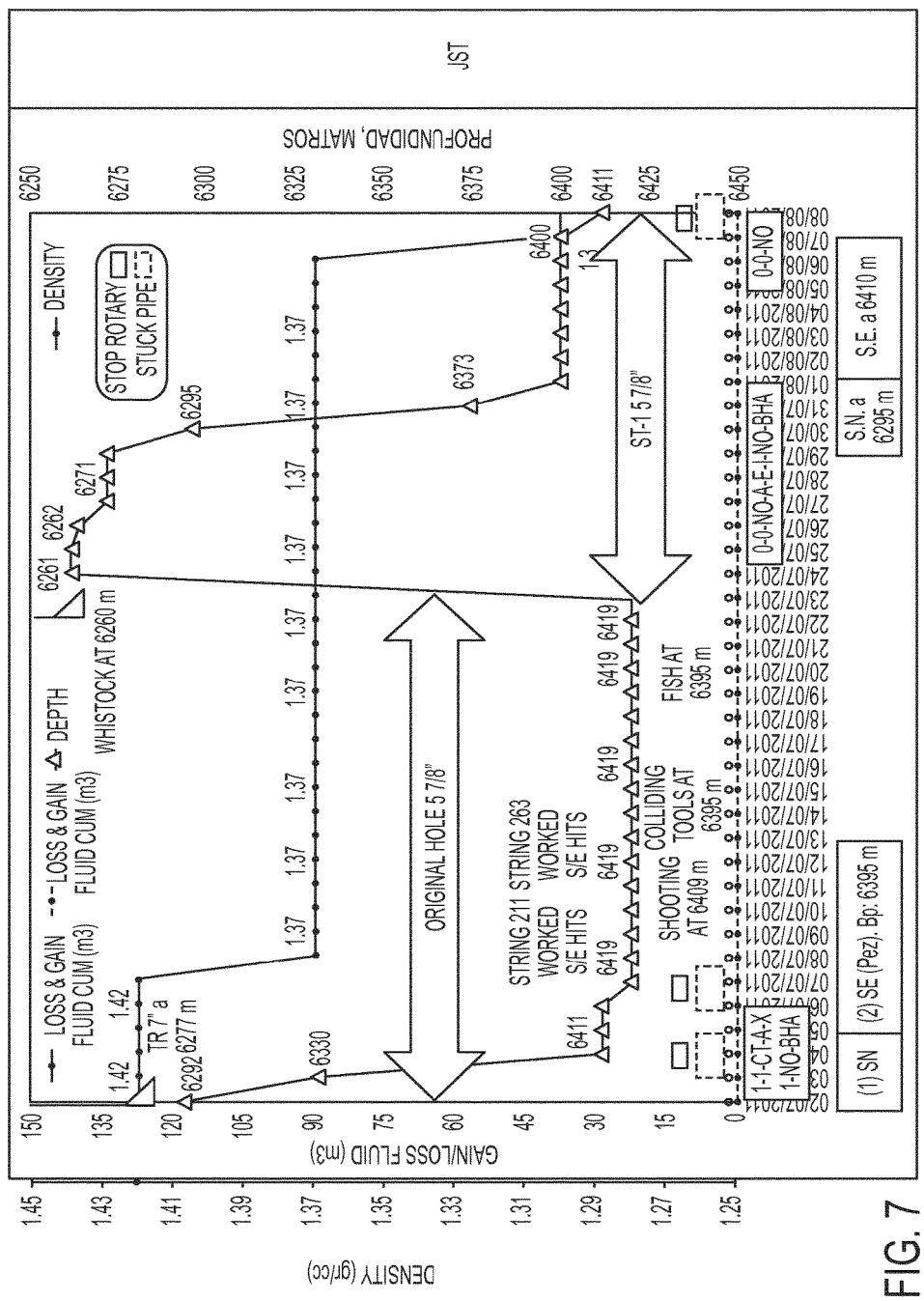

FIGS. 6-7 illustrate examples of real-time cross-plot displays. The real-time cross-plot displays of FIGS. 6-7 can be created as described with respect to FIG. 4. In various embodiments, the real-time cross-plot displays of FIGS. 6-7 can also be updated in real-time as described with respect to FIGS. 2 and 5.

Real-time drilling performance analyses such as those described above allow drilling personnel such as, for example, drilling, geological, or geophysical engineers, to reduce non-productive time (NPT). Alerts, recommendations, and real-time displays such as those described above allow drilling personnel to perform better analyses more quickly and more efficiently using, for example, a single systematic slide provided by a real-time cross-plot display. The automation provided by a system such as, for example, the system 100 of FIG. 1, frees drilling personnel from manually gathering information necessary to analyze and make decisions regarding the drilling performance of a well. For example, in various embodiments, real-time cross-plot displays such as those described above can allow establishment of historical and comparatives analysis for different phases along a given well such as: 17½", 12¼", 8½", 6½" and 5". Therefore, real-time cross-plot displays can be tailored to the objective of the well. Thus, technical analyses and risk detections can be performed in a timely manner and the drilling process can be optimized.

Although various embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth herein.

What is claimed is:

1. A method comprising:
    on a central computing system comprising a server computer, collecting channel data in real-time as the channel data is generated, the channel data comprising measured physical properties determined by sensors in use at a site of a current well;
    the central computing system providing, over a network interface, a real-time cross-plot display for the current well;
    wherein the real-time cross-plot display comprises a drilling-performance data plot and a drilling-event data plot;
    wherein the drilling-performance data plot and the drilling-event data plot each comprise a plurality of data points determined in real-time over a progression of time as the channel data is received;
    in real-time as the channel data is received, the central computing system:
        creating, via the channel data, a new drilling-performance data point for the drilling-performance data plot;
        populating the drilling-performance data plot with the new drilling-performance data point as the new drilling-performance data point is created;
        detecting, via the channel data, a drilling event based, at least in part, on a specified condition defining the drilling event;
        responsive to a determination that the specified condition defining the drilling event is met, creating, via the channel data and the detected drilling event, a new drilling-event data point for the drilling-event data plot;
        populating the drilling-event data plot with the new drilling-event data point as the new drilling-event data point is created; and
        updating the provided real-time cross-plot display with the populated drilling-performance data plot and the populated drilling-event data plot.

2. The method of claim 1, comprising, as the channel data is received, the central computing system:
    retrieving input data comprising historical drilling-performance data for an offset well relative to the current well, wherein the historical drilling-performance data comprises a drilling event for the offset well;
    updating the provided real-time cross-plot display with the drilling event of the offset well; and
    generating an alert responsive to determination that a measured depth for the current well is within a preconfigured distance of a depth at which the drilling event of the offset well occurred.

3. The method of claim 1 comprising, as the channel data is received, the central computing system:
    retrieving input data comprising historical drilling-performance data for an offset well relative to the current well, wherein the historical drilling-performance data comprises geopressure analysis data for the offset well;
    computing data for the current well based on the channel data; and
    updating the provided real-time cross-plot display with the computed data for the current well.

4. The method of claim 3, wherein the real-time cross-plot display comprises a comparative display of the historical drilling-performance data for the offset well and drilling-performance data for the current well relative to depth.

5. The method of claim 3, wherein the computed data comprises pore pressure.

6. The method of claim 5, wherein:
    the input data comprises resistivity data for the offset well;
    the channel data comprises resistivity data for the current well; and
    the computing comprises computing the pore pressure using the resistivity data for the current well and the resistivity data for the offset well.

7. The method of claim 5, wherein the computed data comprises a fracture gradient.

8. The method of claim 7, wherein the retrieving comprises retrieving at least a portion of the input data from settings maintained by a calculation engine resident on the central computing system.

9. The method of claim 8, wherein the at least a portion of the input data comprises at least one of a matrix stress coefficient and a Poisson ratio.

10. A system comprising a processor and memory, wherein the processor and memory in combination are operable to implement a method comprising:
    collecting channel data in real-time as the channel data is generated, the channel data comprising measured physical properties determined by sensors in use at a site of a current well;
    providing a real-time cross-plot display for the current well;
    wherein the real-time cross-plot display comprises a drilling-performance data plot and a drilling-event data plot;
    wherein the drilling-performance data plot and the drilling-event data plot each comprise a plurality of data points determined in real-time over a progression of time as the channel data is received;
    in real-time as the channel data is received:
        creating, via the channel data, a new drilling-performance data point for the drilling-performance data plot;
        populating the drilling-performance data plot with the new drilling-performance data point as the new drilling-performance data point is created;
        detecting, via the channel data, a drilling event based, at least in part, on a specified condition defining the drilling event;
        responsive to a determination that the specified condition defining the drilling event is met, creating, via the channel data and the detected drilling event, a new drilling-event data point for the drilling-event data plot;

populating the drilling-event data plot with the new drilling-event data point as the new drilling-event data point is created; and updating the provided real-time cross-plot display with the populated drilling-performance data plot and the populated drilling-event data plot.

11. The system of claim 10, the method comprising, as the channel data is received:

retrieving input data comprising historical drilling-performance data for an offset well relative to the current well, wherein the historical drilling-performance data comprises a drilling event for the offset well;

updating the provided real-time cross-plot display with the drilling event of the offset well; and generating an alert responsive to determination that a measured depth for the current well is within a preconfigured distance of a depth at which the drilling event of the offset well occurred.

12. The system of claim 10, the method comprising, as the channel data is received:

retrieving input data comprising historical drilling-performance data for an offset well relative to the current well, wherein the historical drilling-performance data comprises geopressure analysis data for the offset well;

computing data for the current well based on the channel data; and updating the provided real-time cross-plot display with the computed data for the current well.

13. The system of claim 12, wherein the real-time cross-plot display comprises a comparative display of the historical drilling-performance data for the offset well and drilling-performance data for the current well relative to depth.

14. The system of claim 12, wherein the computed data comprises pore pressure.

15. The system of claim 14, wherein:

the input data comprises resistivity data for the offset well;

the channel data comprises resistivity data for the current well; and the computing comprises computing the pore pressure using the resistivity data for the current well and the resistivity data for the offset well.

16. The system of claim 14, wherein the computed data comprises a fracture gradient.

17. The system of claim 16, wherein the retrieving comprises retrieving at least a portion of the input data from settings maintained by a calculation engine resident on the system.

18. The system of claim 17, wherein the at least a portion of the input data comprises at least one of a matrix stress coefficient and a Poisson ratio.

19. A computer-program product comprising a non-transitory computer-usable medium having computer-readable program code embodied therein, the computer-readable program code adapted to be executed to implement a method comprising:

collecting channel data in real-time as the channel data is generated, the channel data comprising measured physical properties determined by sensors in use at a site of a current well;

providing, over a network interface, a real-time cross-plot display for the current well;

wherein the real-time cross-plot display comprises a drilling-performance data plot and a drilling-event data plot;

wherein the drilling-performance data plot and the drilling-event data plot each comprise a plurality of data points determined in real-time over a progression of time as the channel data is received;

in real-time as the channel data is received:

creating, via the channel data, a new drilling-performance data point for the drilling-performance data plot;

populating the drilling-performance data plot with the new drilling-performance data point as the new drilling-performance data point is created;

detecting, via the channel data, a drilling event based, at least in part, on a specified condition defining the drilling event;

responsive to a determination that the specified condition defining the drilling event is met, creating, via the channel data and the detected drilling event, a new drilling-event data point for the drilling-event data plot;

populating the drilling-event data plot with the new drilling-event data point as the new drilling-event data point is created; and updating the provided real-time cross-plot display with the populated drilling-performance data plot and the populated drilling-event data plot.

20. The computer-program product of claim 19, the method comprising, as the channel data is received:

retrieving input data comprising historical drilling-performance data for an offset well relative to the current well, wherein the historical drilling-performance data comprises a drilling event for the offset well;

updating the provided real-time cross-plot display with the drilling event of the offset well; and responsive to determination that a measured depth for the current well is within a preconfigured distance of a depth at which the drilling event of the offset well occurred, generating an alert.

* * * * *